United States Patent
Miyagi et al.

(10) Patent No.: US 9,839,954 B2
(45) Date of Patent: Dec. 12, 2017

(54) METHOD FOR PRODUCING CENTER PILLAR REINFORCEMENT

(71) Applicant: NIPPON STEEL & SUMITOMO METAL CORPORATION, Tokyo (JP)

(72) Inventors: Takashi Miyagi, Tokyo (JP); Yasuharu Tanaka, Tokyo (JP); Misao Ogawa, Tokyo (JP); Toshimitsu Aso, Tokyo (JP); Kei Misawa, Tokyo (JP); Hiroshi Yoshida, Tokyo (JP); Kazuhiko Honda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 335 days.

(21) Appl. No.: 14/428,433

(22) PCT Filed: Sep. 26, 2013

(86) PCT No.: PCT/JP2013/076076
§ 371 (c)(1),
(2) Date: Mar. 16, 2015

(87) PCT Pub. No.: WO2014/050973
PCT Pub. Date: Apr. 3, 2014

(65) Prior Publication Data
US 2015/0273563 A1   Oct. 1, 2015

(30) Foreign Application Priority Data
Sep. 27, 2012  (JP) ................................ 2012-214295

(51) Int. Cl.
*B21D 47/01* (2006.01)
*B21D 53/88* (2006.01)
(Continued)

(52) U.S. Cl.
CPC ............... *B21D 47/01* (2013.01); *B21D 5/01* (2013.01); *B21D 22/22* (2013.01); *B21D 22/30* (2013.01);
(Continued)

(58) Field of Classification Search
CPC .......... B21D 47/01; B21D 22/30; B21D 5/01; B21D 22/22; B21D 53/88; B62D 25/04; Y10T 29/49622
See application file for complete search history.

(56) References Cited

U.S. PATENT DOCUMENTS

2013/0239645 A1* 9/2013 Tanaka ................... B21D 22/26
                                                                 72/361

FOREIGN PATENT DOCUMENTS

JP   2003-103306   4/2003
JP   2004-154859   6/2004
(Continued)

*Primary Examiner* — John C Hong
(74) *Attorney, Agent, or Firm* — Clark & Brody

(57) ABSTRACT

A center pillar reinforcement is produced satisfactorily by using a high-tensile material having a low ductility as a blank. The center pillar reinforcement is produced by performing a first step for producing a first intermediate formed product on which a body is partially formed by press-forming the blank using a first press-forming device for drawing, and a second step for pressing the first intermediate formed product by using a second press-forming device for bend-forming.

8 Claims, 10 Drawing Sheets

(51) Int. Cl.
  *B62D 25/04* (2006.01)
  *B21D 5/01* (2006.01)
  *B21D 22/22* (2006.01)
  *B21D 22/30* (2006.01)
(52) U.S. Cl.
  CPC ............ *B21D 53/88* (2013.01); *B62D 25/04* (2013.01); *Y10T 29/49622* (2015.01)

(56) References Cited

FOREIGN PATENT DOCUMENTS

| | | |
|---|---|---|
| JP | 2006-015404 | 1/2006 |
| JP | 2008-307557 | 12/2008 |
| WO | 2011/071434 | 6/2011 |
| WO | 2012/070623 | 5/2012 |

\* cited by examiner

METHOD FOR PRODUCING CENTER PILLAR REINFORCEMENT

TECHNICAL FIELD

The present invention relates to a method for producing a center pillar reinforcement. More particularly, it relates to a method for producing a center pillar reinforcement, which is a reinforcement member for a center pillar, which is one structural part of an automobile body shell, is produced by cold or hot press forming a blank, which is a sheet metal such as a steel sheet.

BACKGROUND ART

An automobile body shell has a monocoque structure which is obtained by joining many formed panels and structural members, which are produced by press-forming a sheet metal to each other. A center pillar (B pillar) is known as one of these structural members. The center pillar is an important structural member that is disposed between a side sill (kicker) forming the body side and a roof rail. The center pillar (a) supports the locking mechanism of a front door and supports a rear door in a freely openable/closable manner, (b) ensures the flexural rigidity and torsional rigidity of the body shell during the automobile running, and (c) ensures a survival space for passengers in a lateral collision. Usually, the center pillar is formed by joining a center pillar outer panel, a center pillar inner panel, and a center pillar reinforcement, which is a reinforcing member disposed between these panels (for example, by spot welding the three lapped sheets).

The center pillar reinforcement includes a body that is lengthy and curved and two substantial T shape sections formed at both end portions in the longitudinal direction (up-to-down direction) of the body, and therefore the center pillar reinforcement is a formed panel taking a substantially I-form outer shape in a plan view.

The body has a cross-sectional shape such as a substantially hat shape formed by a curved and lengthy top sheet, two vertical walls formed so as to connect with both edge portions in the width direction of the top sheet, and outward flanges formed so as to connect with the respective two vertical walls.

Of the two substantial T shape sections, the substantial T shape section disposed in the upper portion of the center pillar reinforcement is joined to any other framework member such as a roof side rail reinforcement, and the substantial T shape section disposed in the lower portion of the center pillar reinforcement is joined to any other framework member such as a side sill outer reinforcement. To assure the joint strength and rigidity of these substantial T shape sections, each of these substantial T shape sections has a top sheet, two curved vertical walls connecting with the top sheet, and outward flanges formed so as to connect with each of the two vertical walls.

The center pillar reinforcement is required to have the above-described complicated shape, to have a high strength, for example, at least 400 MPa as a reinforcing member, and further to be capable of being produced at a low cost.

If it is attempted to produce the center pillar reinforcement by press-forming of a blank sheet of metal, there arises a problem that wrinkles and cracks are liable to occur on the top sheet and flanges in the upper end portion and the lower end portion of the substantial T shape sections. The strength of blank is the higher, this problem is the more remarkable.

To prevent the occurrence of this problem, the center pillar reinforcement is typically produced by drawing press-forming. To perform the drawing press-forming, the metal blank for the center pillar reinforcement is required to have a very high extensibility. Therefore, as the metal blank for the center pillar reinforcement, a material having a relatively low-strength (for example, a steel sheet having a tensile strength of about 340 MPa) can only be used. In order to ensure the required high strength, it is necessary to use a thick and heavy blank. Therefore, the weight of automobile body shell increases, and the production cost rises.

Also, in order to produce the center pillar reinforcement by means of drawing press-forming, the blank needs to have a wide margin thickness (cut-off portion) because the outer peripheral portions of blank are strongly restrained by a blank holder. Thereby, the production cost of center pillar reinforcement further increases.

In addition, some center pillar reinforcements cannot be monolithically molded due to the shape and strength thereof. These center pillar reinforcements need to be formed by joining a plurality of components that are press-formed separately. For this reason as well, the production cost of center pillar reinforcement increases.

Patent Documents 1 to 4 disclose inventions of manufacturing press-formed products each having a simple cross-sectional shape such as a simple hat shape or a Z shape are produced by various types of bend-forming. However, Patent Documents 1 to 4 do not disclose a method for producing the center pillar reinforcement having a high strength and a complicated shape as described above at a low cost.

RELATED ART DOCUMENTS

Patent Document

Patent Document 1: Japanese Patent Laid-Open No. 2003-103306
Patent Document 2: Japanese Patent Laid-Open No. 2004-154859
Patent Document 3: Japanese Patent Laid-Open No. 2006-015404
Patent Document 4: Japanese Patent Laid-Open No. 2008-307557

DISCLOSURE OF THE INVENTION

Problems to be Solved by the Invention

An objective of the present invention is to provide a method for press-forming a blank, for example, not only a blank consisting of a steel sheet having excellent ductility and a relatively low strength but also a blank consisting of a high-tensile steel sheet (tensile strength: 400 MPa or higher) having a low ductility, whereby the above-described center pillar reinforcement can be produced at a low cost without the generation of wrinkles and cracks on the top sheet and flanges in the upper end portion and the lower end portion of substantial T shape sections.

Solution to Problem

The present invention provides a method for producing a center pillar reinforcement by means of press-forming of a metal blank, the center pillar reinforcement comprising a body that is lengthy and partially curved substantially in a bow shape and two substantial T shape sections formed at both end portions in the longitudinal direction of the body, and thereby a panel having a substantial I shape in a plan view being formed, the body having a substantially hat-shaped cross section formed by a curved and lengthy top sheet, two vertical walls connecting with both edge portions in the width direction of the top sheet, and two outward flanges connecting with the respective two vertical walls, the two substantial T shape sections each having a top sheet, and two curved vertical walls connecting with the top sheet; and the two curved vertical walls of at least one of the two substantial T shape sections each having a height which decreases gradually toward a direction from the body to the substantial T shape section, wherein preferably, the blank has an outer shape having portions formed into the respective two substantial T shape sections, the portions being shaped into a curved protrusion, and the center pillar reinforcement is produced by performing a first step for producing a first intermediate formed product by press-forming the blank by using a first press-forming device for drawing, the device comprising a die, a blank holder for clamping the blank together with the die, and a punch for pressing the blank into the die, the first intermediate formed product having a body section and portions that are formed into the two substantial T shape sections, the body section being formed by some parts of the top sheet and each of the two vertical walls in the body and a part of the top sheet and each of the two vertical walls in one substantial T shape section of the two substantial T shape sections, and the portions that are formed into the two substantial T shape sections excluding the some parts of the top sheet and each of the two vertical walls in the one substantial T shape section, and a second step for, by using a second press-forming device for bend-forming, the device comprising, a punch; a pad having a butting surface facing to the protrusion of the punch, and dies for pressing the intermediate formed product onto the punch, pressing the first intermediate formed product in a state in which at least part of each of portions formed in the two substantial T shape sections of the intermediate formed product is clamped by the pad and the punch.

In the present invention, the term "cold" means an atmosphere of room temperature, and the term "hot" means an atmosphere higher than the cold and lower than the $Ac_3$ point, preferably not higher than the $Ac_1$ point.

In the present invention, in the case where the uppermost position in a region in the longitudinal direction where the body section is formed is defined as a longitudinal direction 0% position, the value of the longitudinal direction % is defined so as to be increased with the decrease in the longitudinal direction, and the lowermost position in the body section in the longitudinal direction is defined as a longitudinal direction 100% position, the height of the vertical walls in the body section formed in the first intermediate formed product by the first step is preferably at most 20% of the height of the vertical walls of the center pillar reinforcement at the longitudinal direction 0% position; at least 60% of the height of the vertical walls of the center pillar reinforcement at the longitudinal direction 20 to 60% positions, and at most 20% of the height of the vertical walls of the center pillar reinforcement at the longitudinal direction 100% position.

The present invention illustrates that the die of the first press-forming device has a recess recessed into a bow shape corresponding to the shapes of the some parts of the top sheet and each of the two vertical walls of the first intermediate formed product, and die face surfaces corresponding to the shapes of the top sheet and each of the two vertical walls in the one substantial T shape section of the first intermediate formed product, the blank holder of the first press-forming device has clamp surfaces for clamping the blank together with the die face surfaces of the die, and the punch of the first press-forming device presses the blank into the recess of the die.

The present invention illustrates that the punch of the second press-forming device has a protrusion having a shape corresponding to the body of the center pillar reinforcement, and the pad of the second press-forming device has a butting surface that faces to the protrusion of punch, and clamps at least one of portions formed on the top sheets of the two substantial T shape sections of the first intermediate formed product.

In the present invention, it is preferable that the difference in length in the longitudinal direction between the flange surface of a curved portion in a portion consisting of some part of the body of the center pillar reinforcement and the flange surface of the body of the center pillar reinforcement be at most 0.8% of the length in the longitudinal direction of the flange surface of the curved portion.

In the present invention, the pad and the punch of the second press-forming device may clamp arm sections protruding in the transverse direction in either of portions formed in the two substantial T shape sections of the first intermediate formed product, or may clamp the entirety of the intermediate formed product.

In the present invention, the blank preferably consists of a high-tensile steel sheet having a tensile strength of 400 to 1600 MPa, and the lower limit of the tensile strength of blank is preferably 590 MPa, further preferably 780 MPa, and still further preferably 980 MPa.

Furthermore, in the present invention, the blank is preferably a tailored blank obtained by welding a plurality of materials having different tensile strengths.

Effects of Invention

In the present invention, the center pillar reinforcement is produced by performing the first step for producing the first intermediate formed product by subjecting the blank to shallow drawing by using the first press-forming device, and the second step for bending the first intermediate formed product by using the second press-forming device. Therefore, according to the present invention, even if the blank, for example, not only the blank consisting of a steel sheet having an excellent ductility and a relatively low strength but also the blank consisting of a high-tensile steel sheet (tensile strength: 400 MPa or higher) having a low ductility is press-formed, the center pillar reinforcement can be produced reliably at a low cost without the generation of wrinkles and cracks on the top sheet and the flange in the upper end section and the lower end section of the substantial T shape section.

DESCRIPTION OF EMBODIMENTS

The present invention will now be described with reference to the accompanying drawings.

Figure 1:
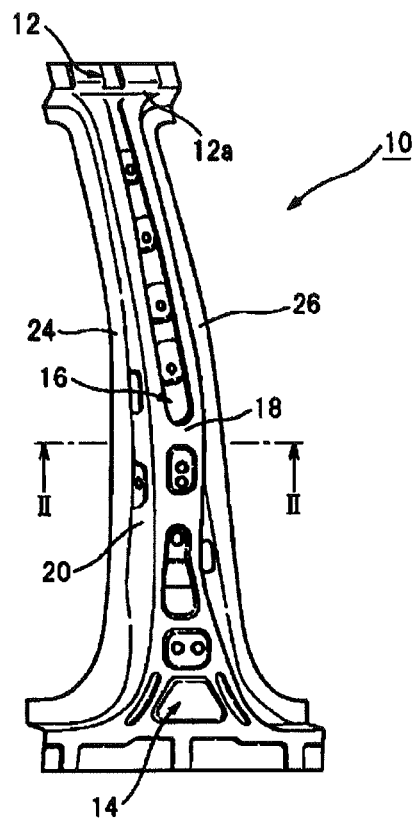
FIG. 1 is a perspective view showing one example of a center pillar reinforcement produced by the method of the present invention.
Figure 2:
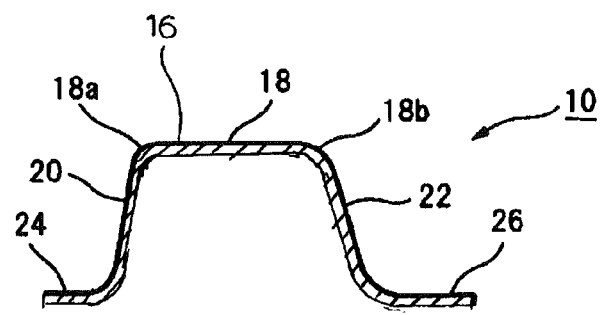
FIG. 2 is a section of a center pillar reinforcement along line II-II in FIG. 1.

FIG. 1 is a perspective view showing one example of a center pillar reinforcement 10 produced by the method of the present invention, and FIG. 2 is a section of the center pillar reinforcement 10 along line II-II in FIG. 1.

As shown in FIGS. 1 and 2, the center pillar reinforcement 10 is a formed panel having a body 16 and two substantial T shape sections 12 and 14. In the explanation below, the substantial T shape section 12 is referred to as an upper substantial T shape section 12, and the substantial T shape section 14 is referred to as a lower substantial T shape section 14.

The body 16 has an outer shape that is lengthy and is partially curved substantially in a bow shape. Also, both of the upper substantial T shape section 12 and the lower substantial T shape section 14 are formed at both end portions in the longitudinal direction of the body 16 so that the width thereof expands in the direction away from the body 16. Since the center pillar reinforcement 10 comprises the upper substantial T shape section 12, the body 16, and the lower substantial T shape section 14 from top to bottom, the center pillar reinforcement 10 has a substantially I-shaped outer shape in a plan view.

In particular, as shown in FIG. 2, the body 16 has a substantially hat-shaped cross section formed by a top sheet 18, two vertical walls 20 and 22 connecting with both edge portions 18a and 18b in the width direction (the right-and-left direction in FIG. 2) of the top sheet 18, and two outward flanges 24 and 26 connecting with the respective two vertical walls 20 and 22.

The body 16 embeds various components (for example, a front door locking mechanism, a rear door hinge, or a seat belt pulling-out mechanism) therein. Also, the two vertical walls 20 and 22 function as sealing surfaces for weather strips installed on a front door and a rear door.

On the other hand, both of the upper substantial T shape section 12 and the lower substantial T shape section 14 have the top sheet 18 and the two curved vertical walls 20 and 22 connecting with the top sheet 18. In the upper substantial T shape section 12 and the lower substantial T shape section 14, the width of the top sheet 18 is expanded gradually, and the two vertical walls 20 and 22 are curved. The height of each of the two vertical walls 20 and 22 in the upper substantial T shape section 12 decreases gradually toward a direction directed from the body 16 to the upper end portion of the upper substantial T shape section 12.

The center pillar reinforcement 10 is one of components forming a center pillar that is disposed between a side sill (kicker) forming the body side in an automobile body shell and a roof rail, and is disposed as a reinforcing member between a center pillar outer panel and a center pillar inner panel. In FIG. 1, only the center pillar reinforcement 10 is shown, and other components are omitted.

The upper substantial T shape section 12 of the center pillar reinforcement 10 is joined strongly, for example, by spot welding to a roof side rail reinforcement (not shown) forming the body side, and the lower substantial T shape section 14 is joined strongly, for example, by spot welding to a side sill reinforcement (not shown) forming the body side.

In the present invention, the center pillar reinforcement 10 is produced by performing first and second steps for press-forming a metal blank in order. Therefore, the first and second steps are explained successively.

[First Step]

Figure 3:
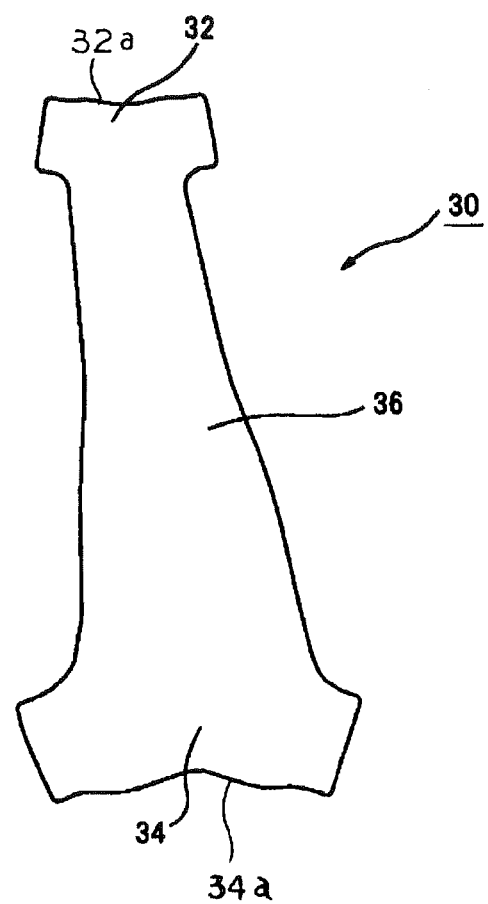
FIG. 3 is a perspective view showing one example of a blank.

FIG. 3 is a perspective view showing one example of a blank 30.

As shown in FIG. 3, the blank 30 of the center pillar reinforcement 10 has an upper end section 32 substantially formed into the upper substantial T shape section 12 of the center pillar reinforcement 10, a lower end section 34 formed into the lower substantial T shape section 14, and a body section 36 that is disposed between the upper end section 32 and the lower end section 34 and is substantially formed into the body 16 of the center pillar reinforcement 10.

Also, to avoid edge crack after forming, portions 32a and 34a which are end edges of the upper end section 32 and the lower end section 34, respectively, each preferably are shaped into a curved protrusion.

The blank 30 is preferably worked in advance to have an outer shape of an appropriate form considering the final shape. Also, the blank 30 may be one metal sheet of a single material, or a tailored blank obtained by welding a plurality of materials having different tensile strengths. Also, the blank 30 preferably consists of a high-tensile steel sheet having a tensile strength of 400 to 1600 MPa. Thereby, it is possible to increase strength and reduce weight of the center pillar reinforcement 10.

Figure 4:
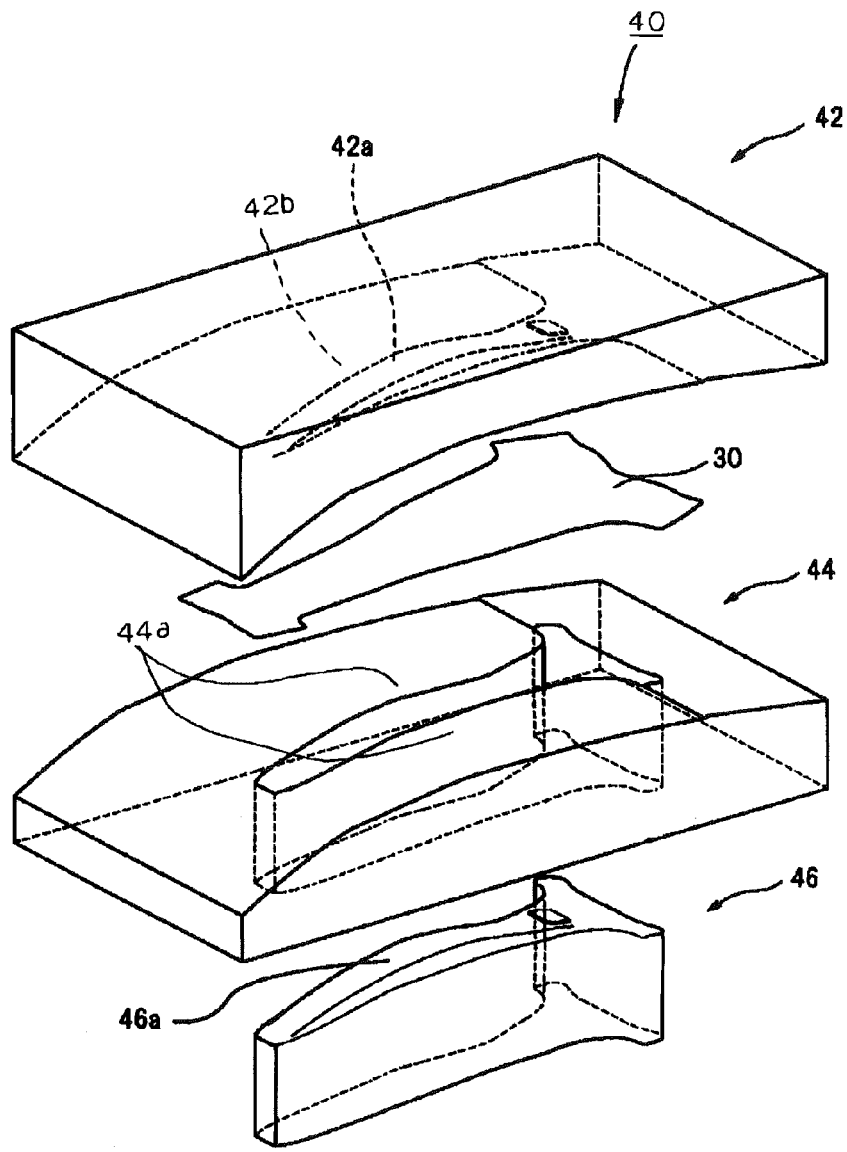
FIG. 4 is a perspective view showing a first press-forming device for performing shallow drawing forming, particularly showing the recess of a die, the clamp surfaces of a blank holder, and the protrusion of a punch, together with a blank.
Figure 5:
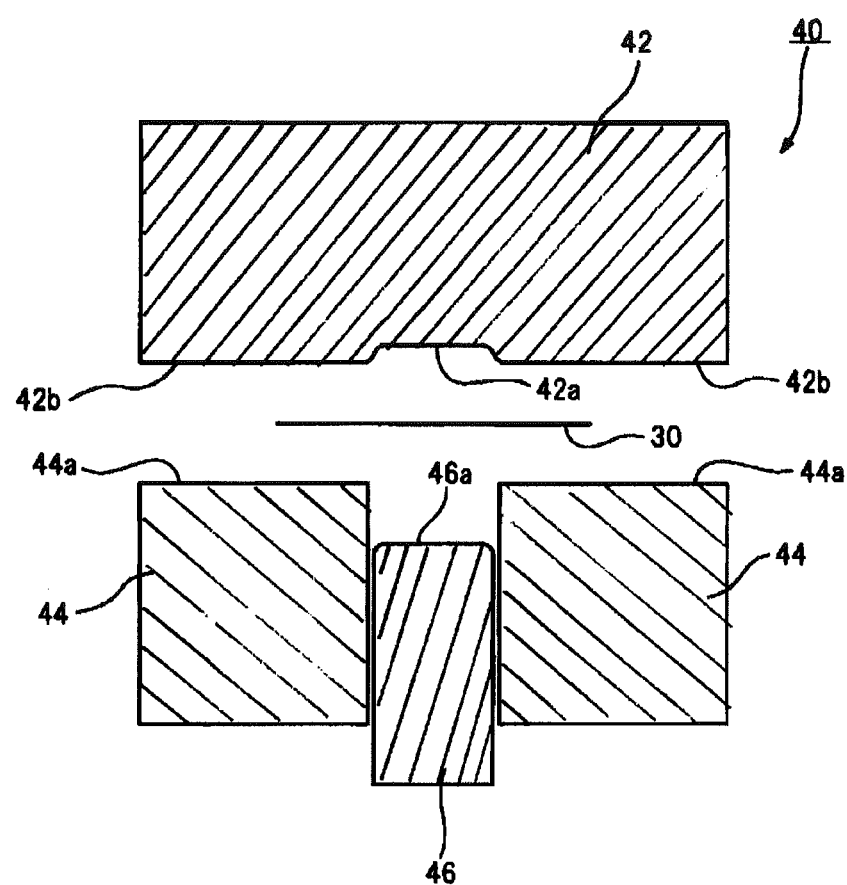
FIG. 5 is a section showing a first press-forming device at the time of shallow drawing start.

FIG. 4 is a perspective view showing a first press-forming device 40 for performing shallow drawing forming, particularly showing a recess 42a of a die 42, clamp surfaces 44a of a blank holder 44, and a protrusion 46a of a punch 46, together with a blank 30. FIG. 5 is a section showing the first press-forming device 40 at the time of shallow drawing start.

As shown in FIGS. 4 and 5, in the present invention, to produce the center pillar reinforcement 10, the first press-forming device 40 for performing press-forming by (shallow) drawing is used.

The first press-forming device 40 includes the die 42, the blank holder 44 disposed so as to face to the die 42, and the punch 46.

As shown in FIGS. 4 and 5, the die 42 has a shape which can achieve forming of a body section 56 of a first intermediate formed product 50, described below, that is, has the recess 42a having a bottom surface recessed in an substantial bow shape, and die face surfaces 42b each consisting of a curved surface extending along the peripheral edge portion of the recess 42a.

Each of the die face surfaces 42b has a shape such that either of the height of the vertical wall of an upper substantial T shape section 52 extending to the outside of the body section 56 of the first intermediate formed product 50 and the height of the vertical wall of a lower substantial T shape section 54 extending to the outside of the body section 56 of the first intermediate formed product 50 decreases gradually toward a direction from the body section 56 to the upper substantial T shape section 52 and the lower substantial T shape section 54, respectively.

The blank holder 44 has the clamp surfaces 44a facing to the die face surfaces 42b of the die 42. Each of the clamp surfaces 44a is formed as a curved surface slightly bulging toward the facing die face surface 42b.

Furthermore, the punch 46 has the protrusion 46a that is curved in a bow shape corresponding to the recess 42a of the die 42.

As shown in FIG. 5, the blank 30, which is a flat sheet metal, is disposed between the die 42 and the blank holder 44. Next, the blank 30 is clamped along the peripheral edge portion of the recess 42a of the die 42 by the die face surfaces 42b of the die 42 and the clamp surfaces 44a of the blank holder 44. Then, the first intermediate formed product 50 is produced by pressing the protrusion 46a of the punch 46 into the recess 42a of the die 42.

Figure 6:
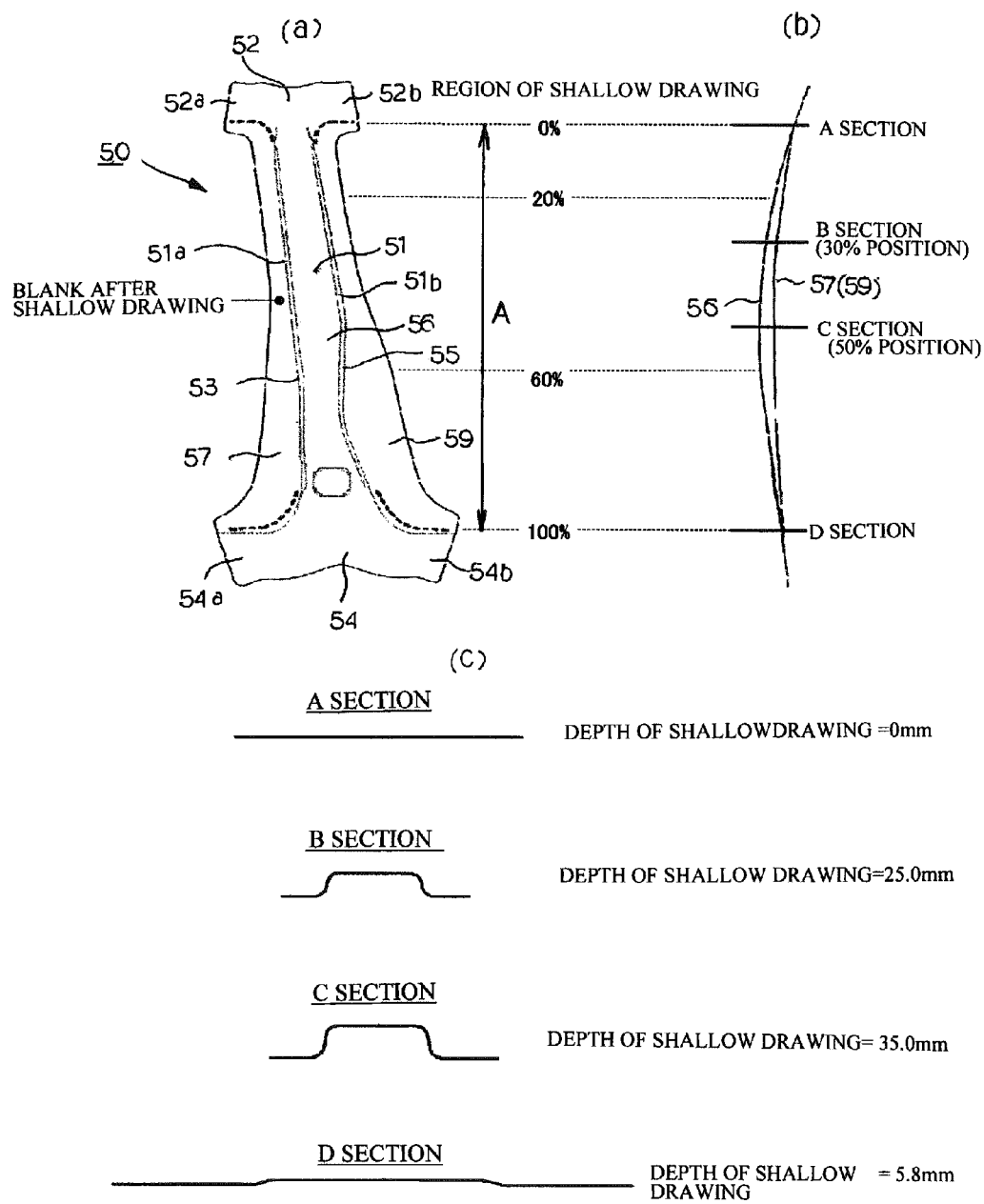
FIG. 6 is a perspective view showing one example of a first intermediate formed product that is produced by shallow-drawing a blank using a first press-forming device, FIG. 6(a) being a front view, FIG. 6(b) being a side view, and FIG. 6(c) showing A to D sections in FIG. 6(b).

FIG. 6 is a perspective view showing one example of the first intermediate formed product 50 that is produced by shallow-drawing the blank 30 using the first press-forming device 40, FIG. 6(a) being a front view, FIG. 6(b) being a side view, and FIG. 6(c) showing A to D sections in FIG. 6(b).

As shown in FIG. 6, the first intermediate formed product 50 has the body section 56 bulging in a bow shape, the upper substantial T shape section 52 that connects with the upper portion of the body section 56 and extends to the outside of the body section 56, and the lower substantial T shape section 54 that connects with the lower portion of the body section 56 and extends to the outside of the body section 56.

The upper substantial T shape section 52 has arm sections 52a and 52b that are formed so as to protrude to the directions opposite to each other in the transverse direction of the first intermediate formed product 50 (the direction substantially intersecting at right angles with the direction in which the body section 56 extends). Also, the lower substantial T shape section 54 has arm sections 54a and 54b that are formed so as to protrude to the directions opposite to each other in the transverse direction of the first intermediate formed product 50 (the direction substantially intersecting at right angles with the direction in which the body section 56 extends).

The body section 56 has a top sheet 51, and vertical walls 53 and 55 extending along edge sections 51a and 51b, respectively, of the top sheet 51. The vertical walls 53 and 55 are formed extending substantially in parallel with the top sheet 51 and connect with outward flanges 57 and 59, respectively, that are formed into the outward flanges 24 and 26, respectively, of the center pillar reinforcement 10.

The body section 56 of the first intermediate formed product 50 forms a part of the body 16 of the completed center pillar reinforcement 10. Comparing with the upper substantial T shape section 12 and the lower substantial T shape section 14 of the completed center pillar reinforcement 10, both of the upper substantial T shape section 52 and the lower substantial T shape section 54 of the first intermediate formed product 50 have shapes such that the shape is even and indefinite, and further the heights of the vertical walls 53 and 55 are smaller than the heights of the vertical walls 20 and 22. In this manner, the blank 30 is subjected to shallow drawing forming by using the first press-forming device 40.

The first intermediate formed product 50 has (i) some parts of the top sheet 18 and each of the two vertical walls 20 and 22 of the body 16 of the center pillar reinforcement 10, (ii) the body section 56 forming the some parts of the top sheet 18 and each of the two vertical walls 20 and 22 of the lower substantial T shape section 14 of the upper substantial T shape section 12 and the lower substantial T shape section 14, and (iii) portions that are formed into the upper substantial T shape section 12 and the lower substantial T shape section 14 excluding the some parts of the top sheet 18 and each of the two vertical walls 20 and 22 of the lower substantial T shape section 14.

As shown in FIG. 6(a), the uppermost position in a region A in which the body section 56 of the first intermediate formed product 50 is formed is defined as a longitudinal direction 0% position, the value of the longitudinal direction % is defined so as to increase with the decrease in the longitudinal direction, and the lowermost position in the body section in the longitudinal direction is defined as a longitudinal direction 100% position. In this case, the height of the vertical walls 53 and 55 of the body section 56 is (i) at most 20% of the height of the vertical walls 20 and 22 of the center pillar reinforcement 10 at the longitudinal direction 0% position, (ii) at least 60% of the height of the vertical walls 20 and 22 of the center pillar reinforcement 10 at the longitudinal direction 20 to 60% positions, and (iii) at most 20% of the height of the vertical walls 20 and 22 of the center pillar reinforcement 10 at the longitudinal direction 100% position.

For example, the heights of the vertical walls 53 and 55 in the A to D cross sections of the body section 56 shown in FIGS. 6(b) and 6(c) are 0 mm, 25.0 mm, 35.0 mm, and 5.8 mm, respectively, and the heights of the vertical walls 20 and 22 in the A to D cross sections of the center pillar reinforcement 10 are 26.6 mm, 25.0 mm, 41.5 mm, and 62.4 mm, respectively. Therefore, the ratios of the heights of the vertical walls 53 and 55 in the A to D cross sections of the body section 56 to the heights of the vertical walls 20 and 22 of the center pillar reinforcement 10 are 0%, 100.0%, 84.3%, and 9.3%, respectively.

[Second Step]

Figure 7:
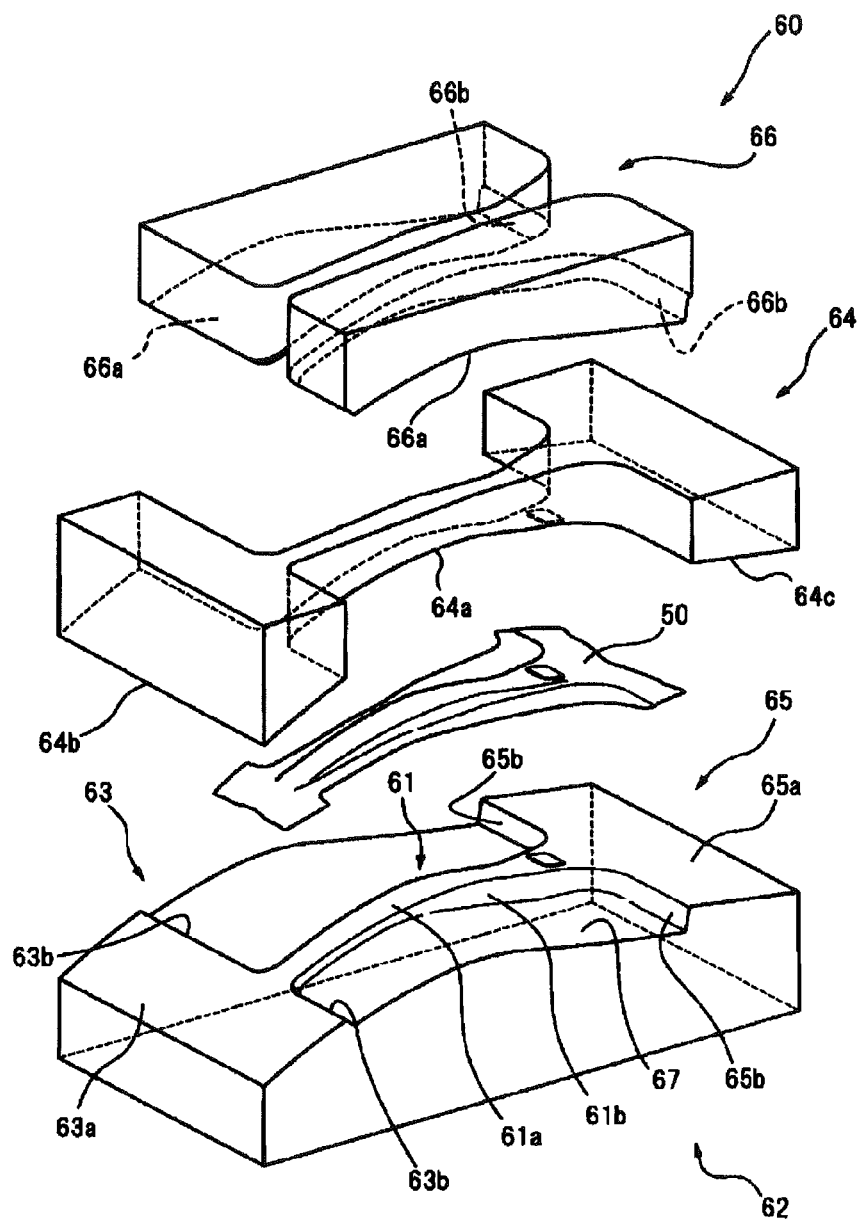
FIG. 7 is a perspective view showing a second press-forming device, particularly showing the upper surface and the protrusion of a punch (the forming surface of punch), the forming surfaces of a die, and the butting surface of a pad, together with a first intermediate formed product.
Figure 8:
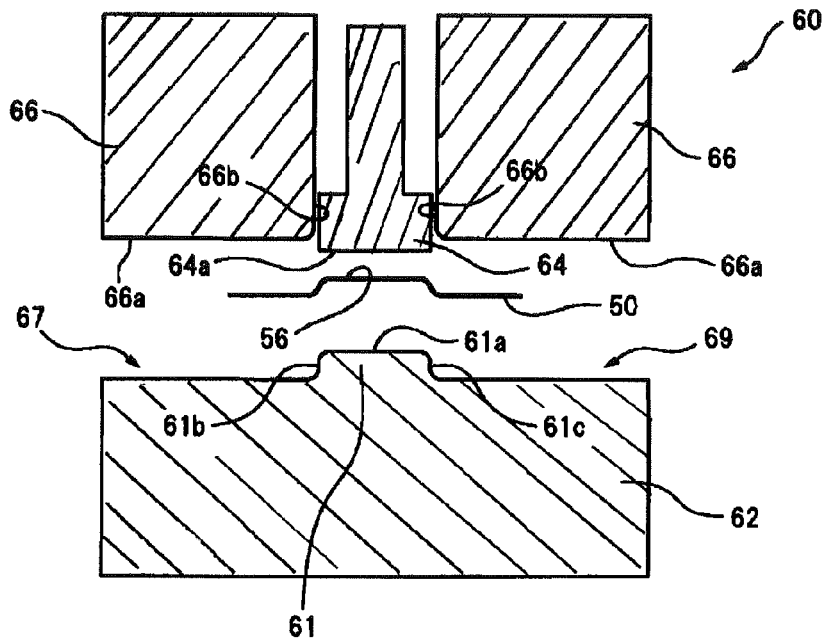
FIG. 8 is a section of a second press-forming device at the time of bending start.

FIG. 7 is a perspective view showing a second press-forming device 60, particularly showing an upper surface 61a and a protrusion 61 of a punch 62 (the forming surface of the punch 62), forming surfaces 66a of dies 66, and a butting surface 64a of a pad 64, together with the first intermediate formed product 50. FIG. 8 is a section of the second press-forming device 60 at the time of bending start, and FIG. 9 is a section of the second press-forming device 60 during bending.

In the present invention, to further press-form subject the first intermediate formed product 50 to bend, the second press-forming device 60 is used.

Figure 9:
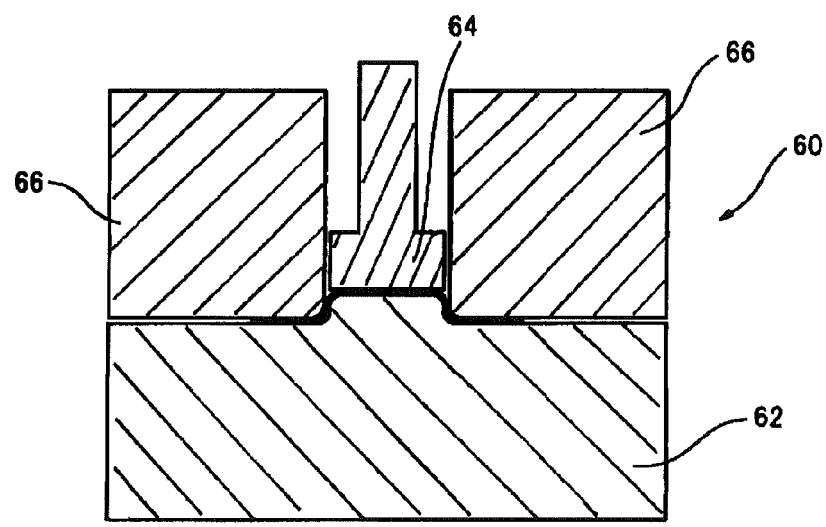
FIG. 9 is a section of a second press-forming device during bending.

As shown in FIGS. 7 to 9, the second press-forming device 60 has the punch 62 having an outer shape capable of forming the shape of the above-described center pillar reinforcement, the pad 64 for clamping the intermediate formed product 50 together with the punch 62, and the bending dies 66 for pressing the intermediate formed product 50 onto the punch 62 together with the pad 64.

As shown in FIGS. 7 to 9, the punch 62 has the body forming part 61 having a shape which can achieve forming of the shape of the body 16 of the center pillar reinforcement 10, an upper end forming part 63 and a lower end forming part 65 disposed in both end portions of the body forming part 61 and can form the shapes of the upper substantial T shape section 12 and the lower substantial T shape section 14, respectively, of the center pillar reinforcement 10, and flange forming parts 67 and 69 that form forming surfaces which can achieve forming of the shapes of the outward flanges 24 and 26, respectively, of the center pillar reinforcement 10.

The body forming part 61 has an upper surface 61a having a shape which can achieve forming of the shape of the top sheet 12 of the center pillar reinforcement 10, and side surfaces 61b and 61c having shapes which can achieve forming of the shapes of the vertical walls 20 and 22, respectively, of the center pillar reinforcement 10.

The upper end forming part 63 and the lower end forming part 65 also have upper surfaces 63a and 65a and side surfaces 63b and 65b, respectively, corresponding to the shapes of the upper substantial T shape section 12 and the lower substantial T shape section 14, respectively, of the center pillar reinforcement 10.

The pad 64 is a component for press-forming and clamping the first intermediate formed product 50 onto the punch 62 during bending of the first intermediate formed product 50. The pad 64 has the central butting surface 64a that faces to the upper surface 61a of the body forming part 61 of the punch 62 and can form the top sheet 16 of the center pillar reinforcement 10, and upper butting surface 64b and lower butting surface 64c having shapes that face to the upper surfaces 63a and 65a of the upper end forming part 63 and the lower end forming part 65, respectively, of the punch 62 and can form the upper substantial T shape section 12 and the lower substantial T shape section 14, respectively, of the center pillar reinforcement 10.

Each of the dies 66 has the flange forming surface 66a that faces to each of the forming surfaces of the flange forming parts 67 and 69 of the punch 62 and can form each of the flange sections 24 and 26 of the center pillar reinforcement 10, and a side surface 66b having a shape which can achieve forming of each of the side surfaces 20 and 22 of the body section 16 of the center pillar reinforcement 10 and each of the vertical walls of the upper substantial T shape section 12 and the lower substantial T shape section 14.

As shown in FIG. 8, the first intermediate formed product 50 is disposed between the pad 64 and dies 66 and the punch 62 so that the body section 56 of the first intermediate formed product 50 is disposed between the body forming part 61 of the punch 62 and the pad 64.

Next, as shown in FIG. 9, the pad 64 is driven toward the punch 62, and the first intermediate formed product 50 is clamped between the pad 64 and the punch 62. By driving the dies 66 toward the punch 62, the first intermediate formed product 50 is pressed onto the punch 62 by the dies 66 and bent in a state of being clamped between the pad 64 and the punch 62. In this manner, the center pillar reinforcement 10 is produced.

The first intermediate formed product 50 has only to be clamped between the pad 64 and the punch 62 at the of bending work start using the dies 66, and as such, the pad 64 and the dies 66 may be driven similarly toward the punch 62.

[Post-Process]

Figure 10:
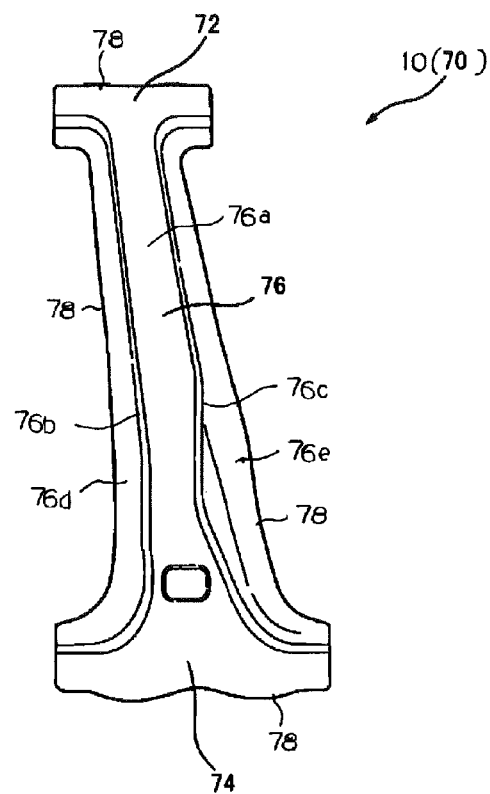
FIG. 10 is a perspective view showing one example of a center pillar reinforcement or a second intermediate formed product that is produced by bending a first intermediate formed product using a second press-forming device.

FIG. 10 is a perspective view showing one example of the center pillar reinforcement 10 or a second intermediate formed product 70 that is produced by bending the first intermediate formed product 50 using the second press-forming device 60.

Depending on the conditions required to the center pillar reinforcement 10, the completed center pillar reinforcement 10 is produced by bend-forming using the second press-forming device 60. However, in the case where the center pillar reinforcement 10 thus obtained needs to be further post-processed, the formed product obtained by bend-forming using the second press-forming device 60 is referred to as the second intermediate formed product 70 as shown in FIG. 10, and the second intermediate formed product 70 is post-processed.

For example, by further subjecting the second intermediate formed product 70 to a restriking process, a level difference (for example, a level difference 12a on the center pillar reinforcement 10 shown in FIG. 1) can be formed particularly in an upper end section 72 of the second intermediate formed product 70.

In this restriking process, the removal of a springback remaining inevitably and slightly on the second intermediate formed product 70 may be removed, or imprinting of a predetermined form such as convexo-concave may be performed on a top sheet 76a or vertical walls 76b and 76c of a body section 76 of the second intermediate formed product 70.

For example, the restriking process is carried out by using a press-forming device for bend-forming (not shown) provided with a die, pad and punch. Also, in the restriking process, peripheral edge sections 78 of the second intermediate formed product 70 may be cut out or trimmed by using a laser processing machine or a shearing machine.

The second intermediate formed product 70 has the body section 76 that is curved in a bow shape on the entirety in the longitudinal direction and has a hat-shaped cross-section, a substantial T shape upper end section 72 that connects with the upper portion of the body section 76 and is formed so as to extend toward the outside of the body section 76, and a substantial T shape lower end section 74 that connects with the lower portion of the body section 76 and is formed so as to extend toward the outside of the body section 76. The shapes of the body section 76, the upper end section 72, and the lower end section 74 of the second intermediate formed product 70 are more definite comparing with those of the first intermediate formed product 50.

Generally, the length in the longitudinal direction of the top sheet 76a of the body section 76 curved in a bow shape is at least 0.8% longer than the length in the longitudinal direction of outward flanges 76d and 76e of the body section 76.

Figure 11:
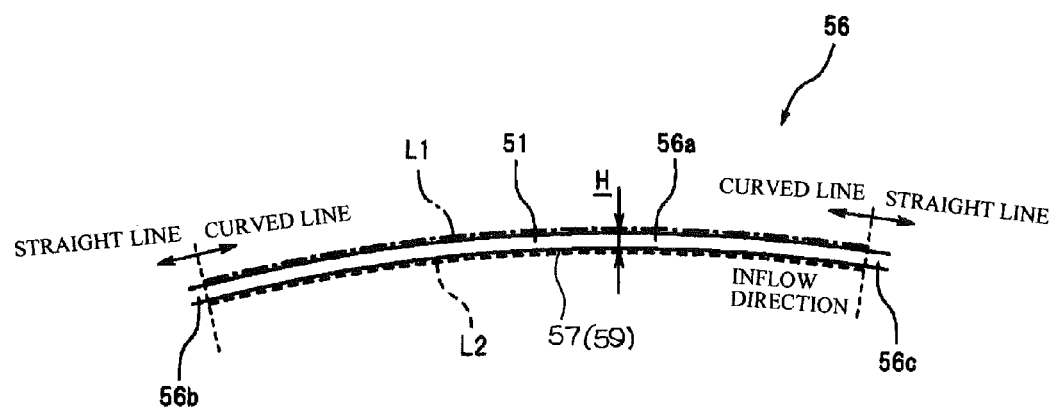
FIG. 11 is a side view of a portion formed into the body section of a first intermediate formed product.

FIG. 11 is a side view of a portion formed in the body section 56 of the first intermediate formed product 50.

Next, a suitable condition not to generate wrinkles in the portions of the first intermediate formed product 50 that are formed into the outward flanges 24 and 26 of the center pillar reinforcement 10 when the first intermediate formed product 50 is drawn by using the first press-forming device 40 is explained.

As shown in FIG. 11, the body section 56 of the first intermediate formed product 50 has a curved portion 56a bulging to the outside, and straight portions 56b and 56c continuous with both end portions in the longitudinal direction of the curved portion 56a. Given the length in the longitudinal direction along the top sheet 51 of the curved portion 56a in the body section 56 of the first intermediate formed product 50 (the length of top sheet surface) is L1, the length in the longitudinal direction of a portion corresponding to the curved portion 56a of the outward flanges 57 and 59 (the length in the longitudinal direction of an outward flange surface) is L2 and the maximum value of heights of the vertical walls 53 and 55, which are distances between the top sheet 51 and the outward flange sections 57 and 59, is H (the height of the curved portion 56a), the value obtained by dividing the difference between the lengths L1 and L2 by L1, {(L1−L2)/L1}×100, is defined as δ (%) (reduction ratio). Since the curved portion 56a has a shape bulging to the outside, L1 is usually longer than L2.

Figure 12:
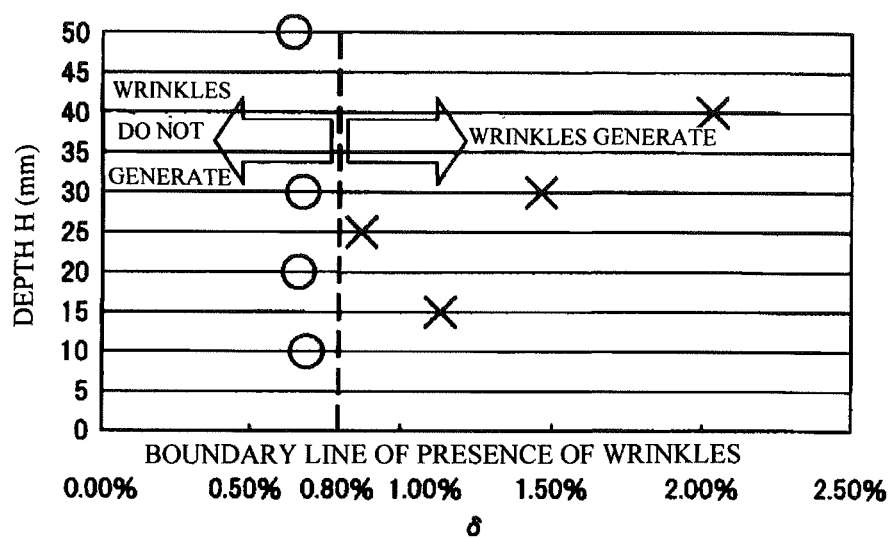
FIG. 12 is a graph showing a simulation result, showing an influence of a reduction ratio δ (%) and a depth H (mm) exerted on the presence of wrinkles in a portion formed into the outward flange of center pillar reinforcement in a first intermediate formed product.

FIG. 12 is a graph showing a simulation result, showing an influence of the reduction ratio δ (%) and the depth H (mm) exerted on the presence of wrinkles in a portion formed into the outward flanges 24 and 26 of the center pillar reinforcement 10 in a first intermediate formed product 50.

In this simulation, the blank of the first intermediate formed product 50 had a strength of 1180 MPa, and had a sheet thickness of 1.6 mm.

As understood from the graph of FIG. 12, in the case where the reduction ratio δ is at most 0.8%, independently of the height H of the curved portion 56a, wrinkles do not occur in the outward flange sections 57 and 59. In contrast, if the reduction ratio δ is higher than 0.8%, wrinkles occur in the outward flange sections 57 and 59.

In the present invention, the first intermediate formed product 50 is produced by shallow-drawing using the first press-forming device 40 so that the reduction ratio δ is at most 0.8%, and thereafter the center pillar reinforcement 10 or the second intermediate formed product 70 is produced by bending the first intermediate formed product 50 while being clamped or pressed by the pad 64 by using the second press-forming device 60. Therefore, comparing with the conventional production method in which the center pillar reinforcement 10 is produced only by drawing the blank 30, according to the present invention, the inflow of material from the end regions of the blank 30 mainly to the upper substantial T shape section 52 and the lower substantial T shape section 54 of the first intermediate formed product 50, that is, to the portions that are formed into the top sheets 18 of the upper substantial T shape section 12 and the lower substantial T shape section 14 of the center pillar reinforcement 10 can be avoided or reduced, and thereby generation of wrinkles in those regions is avoided.

Furthermore, according to the present invention, by shallow-drawing the blank 30 so that the reduction ratio δ is at most 0.8% in the first step, the material is caused to flow out of the regions of the blank 30 that are formed into the outward flanges 24 and 26 of the center pillar reinforcement 10. Therefore, comparing with the production method in which the center pillar reinforcement 10 is produced only by bending the blank 30, generation of wrinkles and cracks in the flange sections 24 and 26 of the center pillar reinforcement 10 is avoided.

Figure 13:
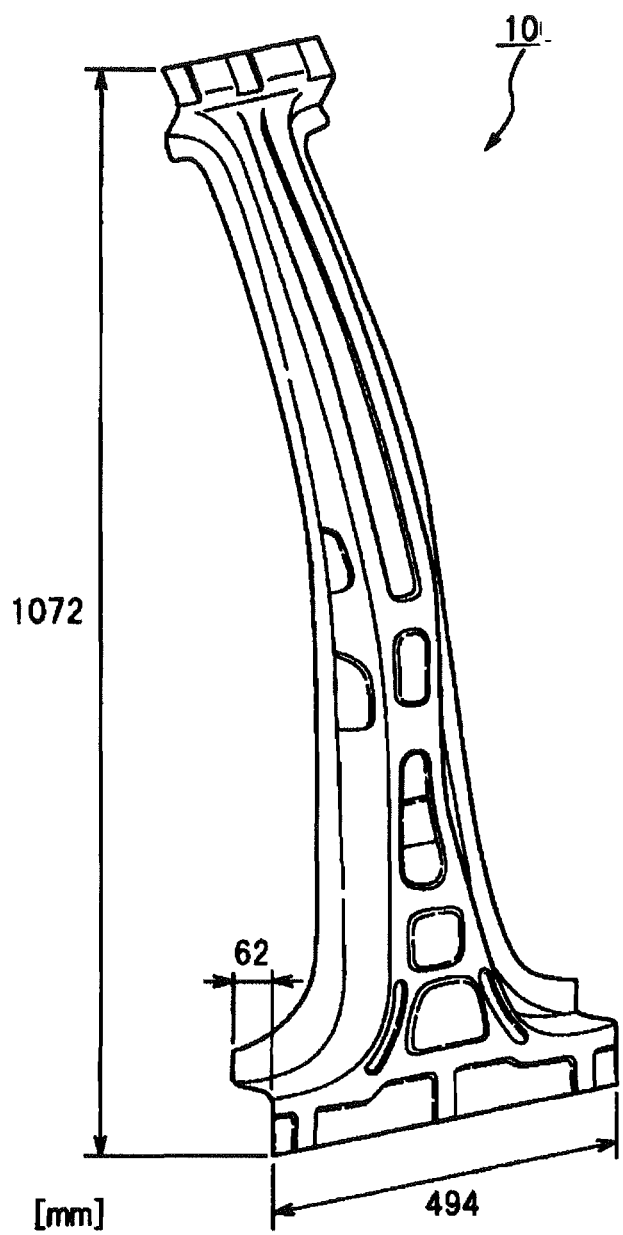
FIG. 13 is a perspective view showing one example of a center pillar reinforcement produced by the method in accordance with the present invention.

FIG. 13 is a perspective view showing one example of the center pillar reinforcement 10 produced by the method in accordance with the present invention, also showing the dimension of each portion.

By the production method in accordance with the present invention, the center pillar reinforcements 10 each having dimensions shown in FIG. 11 were produced experimentally by using the blanks 30 consisting of high-tensile steel sheets having tensile strengths of 590 MPa, 980 MPa, and 1180 MPa.

Furthermore, the center pillar reinforcement 10 was produced experimentally by the method in accordance with the present invention. In this case, the blank 30 which had been obtained by welding a first high-tensile steel sheet having a tensile strength of 1180 MPa and a second high-tensile steel sheet having a tensile strength of 590 MPa in advance, was used, and the portions formed into the upper end section 12 and the body section 16 of the center pillar reinforcement 10 was formed by the first high-tensile steel sheet, and the portion formed into the lower end section 14 was formed by the second high-tensile steel sheet.

As the result, it was confirmed that all of the products made experimentally were able to be worked satisfactorily without the generation of wrinkles and cracks.

In the above explanation, a preferable embodiment of the present invention was explained as an example. However, the present invention is not limited to this embodiment, and various changes, modifications, and improvements can be made within the technical scope of the claims.

For example, in the above-described embodiment, as an example, the entirety of the first intermediate formed product 50 was clamped between the pad 64 and the punch 62. However, the present invention is not limited to this embodiment. In the conventional technique in which the center pillar reinforcement 10 is produced by drawing only, wrinkles is generated due to the inflow of material from the end regions of the blank 30 (the first intermediate formed product 50) mainly to the top sheets of the upper substantial T shape section 12 and the lower substantial T shape section 14 of the center pillar reinforcement 10. In the present invention, therefore, the center pillar reinforcement 10 can be formed satisfactorily even by bending the first intermediate formed product 50 even if some sections of the upper end section 52 and the lower end section 54 of the first intermediate formed product 50 only, in more detail, the arm sections 52a and 52b of the upper end section 52 and the arm sections 54a and 54b of the lower end section 54 only are pressed by the pad 64.

REFERENCE SIGNS LIST 10 center pillar reinforcement
12 upper substantial T shape section
14 lower substantial T shape section
16 body
30 blank
32 upper end section
34 lower end section
36 body section
40 first press-forming device for drawing
44 blank holder
46 punch
50 first intermediate formed product
52 upper substantial T shape section
54 lower substantial T shape section
56 body section
60 second press-forming device for bend-forming
62 punch
64 pad
66 die
70 second intermediate formed product
72 upper end section
74 lower end section
76 body section

The invention claimed is:

1. A method for producing a center pillar reinforcement by means of press-forming of a metal blank, the center pillar reinforcement comprising a body which is lengthy and partially curved substantially in a bow shape and two substantial T shape sections formed at both end portions in a longitudinal direction of the body, and thereby a panel having a substantial I shape in a plan view being formed, the body having a substantially hat-shaped cross section formed by a curved and lengthy top sheet, two vertical walls connecting with both edge portions in the width direction of the top sheet, and two outward flanges connecting with the respective two vertical walls, two substantial T shape sections each having a top sheet, and two curved vertical walls connecting with the top sheet, and the two curved vertical walls of at least one of the two substantial T shape sections each having a height which decreases gradually toward a direction directed from the body to the substantial T shape section, wherein the center pillar reinforcement is produced by performing
a first step for producing a first intermediate formed product by press-forming the blank by using a first press-forming device for drawing, the device comprising a die, a blank holder for clamping the blank together with the die, and a punch for pressing the blank into the die, the first intermediate formed product having a body section and portions that are formed into the two substantial T shape sections, the body section being formed by some parts of the top sheet and each of the two vertical walls in the body, and a part of the top sheet and each of the two vertical walls in one substantial T shape section of the two substantial T shape sections, and the portions which are formed into the two substantial T shape sections excluding the some parts of the top sheet and each of the two vertical walls in the one substantial T shape section, and
a second step for, by using a second press-forming device for bend-forming, the device comprising a punch, a pad having a butting surface facing to a protrusion of the punch, and a die for pressing the first intermediate formed product onto the punch, pressing the first intermediate formed product in a state in which at least part of each of portions formed in the two substantial T shape sections of the intermediate formed product is clamped by the pad and the punch, wherein, in a case where an uppermost position in a region in the longitudinal direction where the body section is formed is defined as a longitudinal direction 0% position, a value of the longitudinal direction % is defined so as to be increased with a decrease in the longitudinal direction, and a lowermost position in the region in the longitudinal direction is defined as a longitudinal direction 100% position, a height of the vertical walls in the body section formed in the first intermediate formed product by the first step is at most 20% of the height of the vertical walls of the center pillar reinforcement at the longitudinal direction 0% position; at least 60% of the height of the vertical walls of the center pillar reinforcement at the longitudinal direction 20 to 60% positions, and at most 20% of the height of the vertical walls of the center pillar reinforcement at the longitudinal direction 100% position.

2. The method for producing the center pillar reinforcement according to claim 1, wherein
the die of the first press-forming device has a recess recessed in a bow shape corresponding to the shapes of some parts of the top sheet and each of the two vertical walls of the first intermediate formed product, and die face surfaces corresponding to the shapes of the top sheet and each of the two vertical walls in the one substantial T shape section of the first intermediate formed product,
the blank holder of the first press-forming device has clamp surfaces for clamping the blank together with the die face surfaces of the die, and
the punch of the first press-forming device pushes the blank into the recess of the die.

3. The method for producing the center pillar reinforcement according to claim 1, wherein
the punch of the second press-forming device has a protrusion having a shape corresponding to the body of the center pillar reinforcement, and the pad of the second press-forming device has a butting surface which faces to the protrusion of the punch, and clamps at least one of portions formed on the top sheets of the two substantial T shape sections of the first intermediate formed product.

4. The method for producing the center pillar reinforcement according to claim 1, wherein a difference in length in the longitudinal direction between the flange surface of a curved portion in a portion consisting of some part of the body of the center pillar reinforcement and the flange surface of the body of the center pillar reinforcement is at most 0.8% of the length in the longitudinal direction of the flange surface of the curved portion.

5. The method for producing the center pillar reinforcement according to claim 1, wherein the pad and the punch of the second press-forming device clamp arm sections protruding in a transverse direction in each of portions formed in the two substantial T shape sections of the first intermediate formed product.

6. The method for producing the center pillar reinforcement according to claim 1, wherein the pad and the punch of the second press-forming device clamp the entirety of the first intermediate formed product.

7. The method for producing the center pillar reinforcement according to claim 1, wherein the blank consists of a high-tensile steel sheet having a tensile strength of 400 to 1600 MPa.

8. The method for producing the center pillar reinforcement according to claim 1, wherein the blank is a tailored blank obtained by welding a plurality of materials having different tensile strengths.

* * * * *